United States Patent [19]

Rhoads

[11] E Re. 30,805

[45] Reissued Nov. 24, 1981

[54] CONTAINER WITH IMPROVED HEAT SHRUNK CELLULAR SLEEVE

[75] Inventor: Roger R. Rhoads, Toledo, Ohio

[73] Assignee: Owens-Illinois, Inc., Toledo, Ohio

[21] Appl. No.: 94,992

[22] Filed: Nov. 16, 1979

Related U.S. Patent Documents

Reissue of:

[64] Patent No.: 4,034,131
Issued: Jul. 5, 1977
Appl. No.: 618,988
Filed: Oct. 2, 1975

U.S. Applications:

[62] Division of Ser. No. 504,111, Sep. 9, 1974.

[51] Int. Cl.[3] ..... B65D 1/02

[52] U.S. Cl. ..... 428/35; 156/85; 156/244.11; 215/12 R; 215/DIG. 6; 264/176 R; 264/46.1; 264/230; 428/304; 428/313; 428/315; 428/320; 428/515

[58] Field of Search ..... 428/35, 304, 313, 315, 428/320, 515; 156/78, 84, 85, 86, 244.11; 264/46.1, 230; 215/DIG. 6, 12 R

[56] References Cited

U.S. PATENT DOCUMENTS

| | | | |
|---|---|---|---|
| 3,221,954 | 12/1965 | Lux | 222/566 |
| 3,620,898 | 11/1971 | Harris | 428/315 |
| 3,637,458 | 1/1972 | Parrish | 428/315 |
| 3,663,663 | 5/1972 | McAda | 260/681.5 |
| 3,760,968 | 9/1973 | Amberg et al. | 215/12 |
| 3,767,496 | 10/1973 | Amberg et al. | 156/86 |
| 3,824,139 | 7/1974 | Ware et al. | 156/79 |

FOREIGN PATENT DOCUMENTS

| | | | |
|---|---|---|---|
| 954069 | 4/1964 | United Kingdom | 428/315 |

*Primary Examiner*—James J. Bell
*Attorney, Agent, or Firm*—E. J. Holler; M. E. Click; D. H. Wilson

[57] ABSTRACT

There is disclosed herein improved packages, and methods of forming same, of the type wherein a container, such as for example a glass container, like a bottle or jar, is provided externally thereof with a heat shrunk, cellular thermoplastic member, circumferentially and snugly engaging a sidewall portion of the container; the improvement resides in employing as the thermoplastic member a composite structure, or laminate, of a closed cellular polymeric layer in which the polymer is a polymer of predominantly olefin moieties and, in adhered relationship to the closed cellular layer, a non-cellular polymeric layer in which the polymer is a polymer of predominantly olefin moieties with the cellular layer being in snug, heat shrunk engagement with the sidewall portion of the container and the non-cellular layer being disposed outwardly of the cellular layer.

22 Claims, 1 Drawing Figure

CONTAINER WITH IMPROVED HEAT SHRUNK CELLULAR SLEEVE

Figure 1:
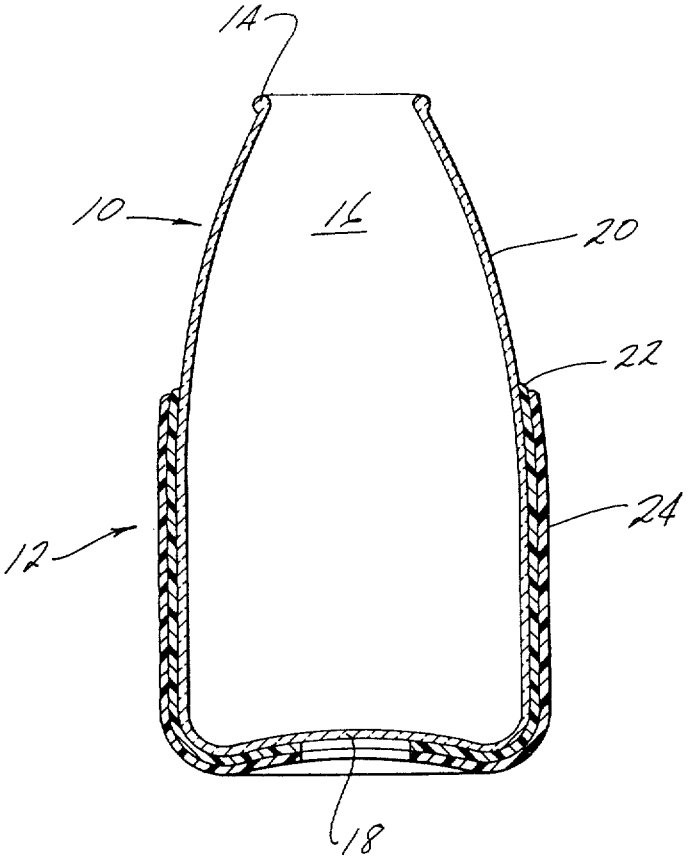

Matter enclosed in heavy brackets [ ] appears in the original patent but forms no part of this reissue specification; matter printed in italics indicates the additions made by reissue.

This is a division of application Ser. No. 504,111 filed Sept. 9, 1974.

The present invention relates to container packages, like bottles and jars, for example, glass containers and, more particularly, relates to an improvement in packages of the type wherein a wall portion of a container is externally and circumferentially, provided with a heat shrunk thermoplastic cellular member. The present invention is also directed to an improved method for forming such packages.

Recently the packaging industry has successfully developed a package wherein a container, such as, for example, a bottle or jar, which has an upper rim portion defining a mouth opening thereof and a lower portion defining the bottom thereof and including an annular wall joining the rim portion to the bottom portion, is provided, at least along an axial portion of the wall with a heat shrunk member of a foamed or cellular thermoplastic material in circumferential snug engagement therewith. This member, which is generally in the form of a sleeve, or tubular shape, provides excellent characteristics to the package and especially to a package wherein the container is a glass container. Such packages are, for example, described in U.S. Pat. No. 3,760,968. Typically these packages are produced by first forming a web, film, or sheet, of a heat shrinkable, cellular thermoplastic material, by conventional processing, for example by an extrusion process like a blown bubble extrusion process. The process is carried out to provide a heat shrinking characteristic in the sheet, by a conventional stretching operation, in which the major shrinking, or orientation or stretching, occurs along the machine direction and only a minor shrinking occurs along the transverse, or cross, direction. The sheet, or web, is also provided, by air cooling, with a skin at each opposed surface of higher density than the central, or core, portion of the cellular web and the depth of the skin on one side is at least about 1.2 times greater than the depth on the other side; these surfaces are smooth, i.e. not roughed up to become fibrillated. This sheet, or web, can then be appropriately provided with a decorative image and the sheet then slit along the machine direction of extrusion to provide rectilinear films or sheets which are then employed in forming the package. These rectilinear sheets, or films, are again cut and then formed into a generally, right cylindrical sleeve with the machine direction of prior forming being the circumferential, or radial, direction of the sleeve and the axial dimension of the sleeve being the previous cross, or transverse, dimension. The reason for this is to provide a more significant circumferential or radial shrinkage about the container than an axial shrinkage. Additionally, the sleeve is formed so that the greater skin depth side is the interior surface. Typically, the rectilinear sheet is formed into a sleeve by being brought into contact with a mandrel and the opposed ends of the rectilinear sheet then sealed to each other, such as, for example, in an overlapping relationship by the use of appropriate means, for example a compressing heat mechanism. The sleeve is then brought into telescopic relation with the container and positioned or located around a wall portion and heat shrunk to bring it into an annular snug, compressing, engagement with the wall portion of a container. After heat shrinking, therefore, the sleeve is disposed circumferentially outwardly of the annular sidewall of the container and is in a heat shrunk condition generally disposed at least along a portion of the axial dimension of the sidewalls. Typically, when containers are employed that have a recessed bottom, such as a concave bottom, the heat shrunk sleeve includes a lower annular portion extending partially inwardly into the recessed area of the bottom. For further details as to the method of forming such plastic covered containers reference may be had to U.S. Pat. No. 3,767,496 and reference may also be had to U.S. Pat. No. 3,802,942 which discloses suitable apparatus for forming such packages. The three above-noted patents are hereby incorporated by reference.

Of course, the container, in addition to having the heat shrunk member position therearound, may be provided with thermoplastic coating materials at various and numerous locations on the container. This concept of employing the heat shrunk member in combination with various types, and locations, of polymeric coatings is described in co-pending application, U.S. Ser. No. 372,156, filed June 21, 1973.

The materials which are taught to be employed to form the rectilinear sheet or film, which is then formed into the sleeve and heat shrunk, include polyvinyl chloride, polyethylene, polystyrene, "copolymers of carboxylic acid monomers with ethylene (sold under the tradename SURLYN)", cellulose esters, for example, cellulose propionate, butyrate, and acetate, polyamides, and polyurethanes. From a commercial point of view the material which has been found to be most suitable to date has been a closed cellular, general purpose polystyrene material. Unfortunately, however, this cellular polystyrene material is possessed of certain deficiencies not the least of which include brittleness, easy tearing, relatively easy fracture, poor glass retention when a glass container breaks and susceptibility to denting, scarring and splitting. When one considers the total process which includes slitting or cutting of the material this latter problem and the tearing tendency is indeed quite significant. These deficiencies, of course, are reflected in consumer acceptance and also in economies for providing the above packages. The other materials are also possessed of deficiencies. For example, when a non-cellular polyethylene is employed, because of its limpness, it will be found that difficulty is encountered in economically using this material on the equipment disclosed in incorporated patent U.S. Pat. No. 3,802,942. From a practical point of view production speeds are seriously handicapped by employing such a non-cellular polyethylene. Additionally, the use of a non-cellular polyethylene requires the material to be heavily pigmented in order to get the desired degree of opacity, which degree of pigmentation obviously carries with it severe economic penalties. Similarly, if a cellular polyethylene material is employed difficulties are likewise encountered; for example, it is difficult to provide a smooth printable surface on the cellular polyethylene. Additionally, a cellular polyethylene does not have the desired glass retention characteristics when the ultimate package which includes a glass container is broken.

Thus, it will be seen that a problem exists in the above referred to art and a need exists for providing a sleeve member which has excellent properties including for example ease of printability, good flexibility, a lack of undesirable brittleness, good resistance to fracture, good glass retention, good resistance to denting, scarring, tearing, and splitting, good melt strength, good handling characteristics and which does not need to be heavily pigmented to produce the needed opacity. In accordance with this invention an improvement is provided with respect to the sleeve member and the problem in the prior art is solved. That is, the present invention satisfies a need in the art for providing a sleeve member which has the needed balance of properties.

Thus, in accordance with one feature of this invention there is provided an improvement in articles of manufacture comprised of a container having an annular rim defining a mouth opening at one end thereof, a lower end providing the bottom thereof, and an annular wall interposed between the rim and the lower end and which further includes a heat shrunk, polymeric sleeve disposed circumferentially outwardly of said wall and in snug engagement therewith.

In accordance with another feature of this invention, there is provided an improvement in methods for producing articles of manufacture wherein a heat shrinkable polymeric sheet is formed into a sleeve having a major orientation or heat shrink characteristic circumferentially of the sleeve, and wherein the sleeve is telescopically located about the sidewall of the container and heat shrunk into engagement with the sidewall.

The improvement in the above-noted method and article essentially resides in employing a heat shrinkable polymeric sheet, and sleeve, which is of a composite structure having a layer of a closed cellular predominantly olefin polymer adhered to a layer of a non-cellular predominantly olefin polymer wherein the cellular layer is in, and intended for, engagement with the wall of the container and the non-cellular layer is disposed outwardly of the cellular material and has a smooth, glossy non-fibrillated externally disposed, or exposed, surface.

An improved package of this invention is exemplified in FIG. 1 which is a vertical sectional elevation view. The package is comprised of a container 10 and a heat shrunk sleeve of composite structure, generally designated 12. Container 10 includes an upper rim 14 defining a mouth opening 16 of the container and further includes a lower end, or bottom, 18 and an annular sidewall 20 interposed rim 14 and lower end 18. The container, of course, can be of any configuration and of any materal, but as set forth in the drawings it is exemplified as a glass container. The ultimate package, of course, will include closure means (not shown) closing mouth opening 16. Composite polymeric sleeve 12 is disposed circumferentially outwardly of wall 20 in heat shrunk, snug engagement therewith. Composite sleeve 12, as indicated, is a two-layer structure, the first layer 22 being a closed cellular structured polymeric material in contact with wall 20 and the second layer 24, which is of a nonfoamed or non-cellular polymeric material, is disposed outwardly of cellular layer 22 and in adhering engagement therewith. FIG. 1 also exemplified a package in which the lower end 18 of container 10 is recessed, i.e., possessed of a lower concave bottom, with sleeve 12 including a lower annular portion extending partially inwardly into the recessed area of the bottom. Preferably, cellular layer 22 is a closed cellular polyethylene and non-cellular layer 24 is also polyethylene.

The polymeric materials respectively and independently contemplated for cellular layer 22 and non-cellular layer 24 are predominantly olefin polymers; that is, each of these polymeric layers will have as the predominant polymeric moiety a polymer of an olefin, preferably an olefin having 2–4 carbons, or mixtures thereof, e.g., the predominant moiety will be a polymer of ethene, propene, butene, like butene-1, or mixtures thereof, more commonly referred to as a polymer of ethylene, propylene or butylene. This includes homopolymers, copolymers of these olefins with other copolymerizable monoethylenically unsaturated monomers, wherein the olefin in the copolymerization is such that the moiety thereof in the final copolymer, that is the ethylene, propylene or butylene moiety, is at least about 60% by weight, and polymeric blends, or admixtures, wherein the resulting polymeric blend is at least about 60% by weight of a polymerized olefin moiety, e.g. at least about 60% of an ethylene moiety in the blend. The minor amounts, i.e. less than about 40% of the other moiety of material employed, are such as to supplement and compliment the basic properties of the olefin polymer and this applies whether other moieties are introduced by way of a polymer blend, or admixture, or by way of a copolymerized monomer. These other moieties, whether supplied by blending another polymer with a homopolymerized olefin, e.g. homopolymerized ethene, (ethylene homopolymer), or by copolymerization therewith, should not be such as to significantly interfere with the foamable, heat sealable, heat shrinkable, extrudable characteristics of the base olefin polymer and should be compatible, i.e. miscible with it. Exemplary olefin homopolymers are ethylene, propylene and butylene homopolymers, with the former being especially preferred, and blends of these homopolymers. In passing, when the terminology polyethylene, polypropylene and polybutylene are used, this contemplates not only strict homopolymers but also those materials recognized and sold commercially under those names, even though those materials, strictly and technically, may be viewed by some to be a blend, or copolymer, since the materials may include small amounts, typically less than about 5%, e.g. 0.5–3% by weight, of another polymeric moiety. For example, polyethylene is sold and recognized by that name when in fact it may be produced by copolymerization with 1–2 percent by weight of hexene, or butadiene, or may, by analysis, show several percent, e.g. 3–5% of vinyl acetate moiety; for practical purposes however these materials consist essentially of polyethylene. Given the foregoing guidelines those skilled in the art will routinely select the appropriate copolymerizable monoethylenically unsaturated monomer, or monomers, which will be copolymerized with the above olefins for use herein. Thus, exemplary comonomers, especially with regard to copolymerization with ethene to form an ethylene copolymer, include vinyl esters of saturated carboxylic acids, alpha-beta monoethylenically unsaturated carboxylic acids and alkyl esters of alpha-beta monoethylenically unsaturated carboxylic acids. Exemplary of highly preferred vinyl esters of saturated carboxylic acids are those wherein the carboxylic acid moiety contains from 2 to 4 carbon atoms, with vinyl acetate being especially highly preferred; when using these co-monomers it will be desirable to employ them in such amount that the moiety of the resulting copolymer is less than about 15% by weight, preferably less than about 10%, for example about 2 to about 8 weight percent, of the vinyl ester and the remainder, e.g. at least about 85% and preferably at least 90%, substantially being polymerized ethylene moieties or polymerized olefin moieties. Exemplary of the co-monomeric alpha-beta monoethylenically unsaturated carboxylic acids are those acids having 3 to 5 carbon atoms, for example acrylic acid, methacrylic acid, and ethacrylic acid with the amount of this co-monomer being such that the resulting copolymer is desirably less than about 35 weight percent, preferably less than about 20% and most suitably about 10 to about 15 weight percent of moieties from those acids and the remainder, desirably at least about 65%, preferably at least about 80% being moieties of an olefin, e.g. ethylene moieties. Exemplary of the alkyl esters of alpha-beta monoethylenically unsaturated carboxylic acids are those wherein the acid moiety includes 3 to 5 carbon atoms such as, for example acrylic, methacrylic, and ethacrylic acid moieties, and wherein the alkyl moiety contains 1 to 3 carbon atoms, for example methyl, ethyl, and propyl with an ethylene-ethyl acrylate copolymer being especially preferred; preferably the amount of this co-monomer will be such that the alkyl ester of alpha-beta monoethylenically unsaturated acid moiety of the copolymer will be less than about 25% by weight, desirably less than about 20% by weight and quite suitably about 12 to about 18% by weight with the balance being moieties of a polymerized olefin, e.g. at least about 75% ethylene, desirably at least about 80%. Suitable blends or admixtures which may be employed are blends of the aforementioned olefin homopolymers with copolymers of any of these olefins and such materials as vinyl esters of unsaturated carboxylic acids, alpha-beta monoethylenically unsaturated carboxylic acids, and alkyl esters of alpha-beta monoethylenically unsaturated carboxylic acids. These copolymers used in blending may include a wide range of the amount of co-monomer polymerized with the olefin but generally when these copolymers are blended with the olefin homopolymer, the moiety of polymerized olefin (including moieties supplied by the homopolymer and moieties supplied in the copolymer) in the polymer blend, or admixture, will generally be at least about 60% by weight and, most desirably, the blends ultimately will have the amounts indicated immediately hereinabove with regard to the discussion of the use of a copolymer per se. That is, if an olefin homopolymer, e.g. ethylene homopolymer, is blended with a copolymer of an olefin and a vinyl ester of a saturated carboxylic acid, e.g. an ethylene-vinyl acetate copolymer, the moiety of the blend will be at least about 85 weight percent, preferably at least about 90%, e.g. about 92 to about 98%, of an olefin polymer and less than about 15%, preferably less than about 10%, e.g. about 2 to about 8% of a vinyl ester of a saturated carboxylic acid. Similarly the moiety of an olefin polymer will be at least about 65 weight percent, preferably at least about 80%, e.g. about 85 to about 90%, and the moiety of an alpha-beta monoethylenically unsaturated carboxylic acid will be less than about 35 weight percent, preferably less than about 20%, e.g. 10–15%, in a blend of an olefin homopolymer with a copolymer of an olefin and such acid. A blend of an olefin homopolymer with a copolymer of an olefin and an alkyl ester of an alpha-beta monoethylenically unsaturated carboxylic acid desirably will show an olefin polymer moiety of at least about 75 weight percent, preferably at least about 80%, e.g. about 82% to about 88%, and less than about 25%, preferably less than about 20%, of an alkyl ester of an alpha-beta monoethylenically unsaturated carboxylic acid moiety; the preferred moieties will be ethyl acrylate and ethylene (supplied via the homopolymer and the copolymer).

The foregoing generally describes the composition of the polymeric portion of the cellular layer 22 and non-cellular layer 24, it being understood that the layers need not be of the same polymeric composition. It will, of course, be apparent that suitable adjuvants may be present in these layers if desired. Thus, for example in addition to the polymeric material, the respective layers can include pigments, stabilizers, and the like. Generally, excellent results will be obtained by selecting a polymeric composition for cellular layer 22 which has a melt index or melt flow of less than 5, for example between about 0.1 to 5 and most desirably about 0.2 to 1 and the polymeric material selected for the non-cellular layer 24 will have a melt index or melt flow of less than about 10. The preferred material for both the cellular layer and the non-cellular layer is polyethylene, which includes low density polyethylene, for example polyethylene having a density of less than 0.925 grams/cc, generally in the range of about 0.910 to about 0.925, high density polyethylene, for example that having a density greater than about 0.941, typically about 0.941 to about 0.965, medium density polyethylene, and blends thereof.

As previously indicated the present invention is directed to an improvement in the hereinbefore-described packages wherein, in producing these packages, a heat shrinkable sheet or film is first prepared which is appropriately cut and slit and formed into rectilinear sheets which are then formed into a heat shrinkable sleeve or tubular member which is then telescopically located about the container to produce the ultimate package. While a sheet or film of stock material of the composite structure for use herein may be formed by various techniques it is generally preferred to employ extrusion technology. This extrusion technology may take either of two conventional forms, one of which is extrusion coating and the other of which is the use of co-extrusion technology. The latter technique, however, is particularly highly preferred because of the apparent ability to form lower density composite structures. In the co-extrusion technique, while a slit die may be employed, the preferred practice is to employ an extrusion die which is possessed of an annular, circular opening and the composite structure is initially formed as a tubular shape by what is referred to in the art as a "blown bubble" technique. These types of co-extrusion dies are widely available commercially and an exemplary die is set forth in SPE Journal, Nov. 1969, Vol. 25, page 20, entitled, "Co-Extrusion of Blown Film Laminates". In this known co-extrusion technique the circular opening is fed from two independent extruders and, in this particular instance, the extruder supplying the foamable material, intended to form cellular layer 22, preferably will feed the die so that this material forms the internal portion of the tubular extrusion; the extruder feeding the material intended to form non-cellular layer 24 will preferably be fed to the die so as to form the external portion of the tubular shape. The tubular member issuing from the extruder is blown into a bubble by conventional "bubble" forming techniques, including air cooling of the external surface thereof, and is then drawn through the nip of two juxtaposed rollers wherein the tubular member is compressed to form a flattened tube. As is well known foaming occurs, and the cellular structure results, just as the extrudate leaves the die. This flattened tube is then contacted with cutting knives which slit the flattened tubular member along its edges (machine direction) so as to form a sheet or film of substantially uniform width; this sheet or film, which is at this point actually a sheet of two superimposed composite structures, for use herein, is separated into two independent sheets and wound onto independent winding wheels, which provides the stock of the heat shrinkable composite structure for use herein. Inasmuch as the sheet or film of the composite structure must possess heat shrinkable characteristics the appropriate heat shrinking in the machine direction of extrusion, which preferably is a major amount and is greater than the cross direction heat shrinkage, is primarily provided by the impetus of the rate of drawing of the flattened tube through the nip of the rolls, and using cooling air on the exterior of the bubble, and the cross direction shrinkage, which is less than the machine direction shrinkage, is primarily provided by the internal air employed in forming the bubble and external cooling air. This of course is known for forming heat shrinkable films.

Of course the material fed, or charged, to the extruder intended to supply the foamable material, i.e., cellular forming composition, will include effective foaming amounts of suitable foaming or blowing agents, either with or without nucleators. The foaming agent may be either of the conventionally recognized classes of foaming agents to wit, physical foaming agents or chemical foaming agents, more commonly referred to as chemical blowing agents. Exemplary of the physical foaming, or blowing agents are the alkanes, such as, for example, pentane, hexane, and heptane, and halogenated materals such as methyl chloride, methylene chloride, trichloroethylene, dichloroethane, dichlorotetrafluoroethane, trichlorofluoromethane, trichlorotrifluoroethane, dichlorodifluoromethane and the like. If desired conventional nucleators such as, for example, a mixture of sodium bicarbonate and citric acid may be employed along with the physical foaming agent. Preferably, however, the foaming or blowing agent employed will be a chemical blowing agent. Generally, in forming the foamed or closed cellular layer highly desirable results will be obtained following the teachings of U.S. Pat. No. 3,502,754, i.e., using two chemical blowing agents, one of which is a foaming agent and the other of which is a nucleating agent. Particularly fine results will be obtained by employing about 0.3 to 0.4% by weight of azodicarbonamide as the nucleating agent and about 1% of N,N'dimethyl-N,N'dinitrosoterephthalamide as the foaming agent, when considering these two materials along with the resin, or polymer, charged to the extruder, as constituting a 100% extruder charge. Another suitable system is to use about 0.6% of azodicarbonamide and about 0.3% of p,p'-oxybis (benzenesulfonyl hydrazide).It will, of course, be apparent that other chemical foaming agents can similarly be employed. Exemplary of these other materials are the azo compounds, N-nitroso compounds, and the sulfonyl hydrazides. Thus, exemplary, suitable chemical blowing agents include; azodicarbonamide (1,1'-azobisformamide), azobis (isobutyronitrile), diazoaminobenzene, N,N'-dimethyl-N, N'-dinitrosoterephthalamide, N,N'-dinitrosopentamethylenetetramine, benzene sulfonyl hydrazide, p-toluene sulfonyl hydrazide, diphenylsulfon-3,3'-disulfonyl hydrazide, and p,p'-oxybis benzenesulfonyl hydrazide which are well known and commercially available, all of which are used in effective foaming amounts, but generally less than about 2% by weight. For example satisfactory results can be obtained by using about 0.5% to about 1% by weight of azodicarbonamide.

The rolled stock of the heat shrinkable composite structure of closed cellular layer 22 and non-cellular layer 24 which is in adhering engagement with layer 22 is then used in the manner taught in incorporated patents U.S. Pat. Nos. 3,767,496, 3,802,942, and 3,760,968. That is, the rolled stock is preferably first decorated, with the decoration being applied onto non-cellular layer 24 by conventional techniques, and the resulting rolled stock then slit along the machine direction to form strips of the composite structure. These strips are then in turn again cut, or slit, along the cross direction and formed into generally cylindrically shapes such as sleeves or tubular members for ultimate utilization herein. These sleeves are so formed such that the major shrinkage will be in the circumferential or radial direction of the sleeve and the minor heat shrinkage will be in the axial direction of the sleeve. That is, the sleeve will be so formed such that the machine direction of extrusion will now become the circumferential, or radial, direction of the sleeve and the cross direction of extrusion will now become the axial direction of the sleeve. In order to provide extremely desirable results the machine direction heat shrinkage will be on the order of at least about 50% and the cross direction, or transverse direction, heat shrinkage will be on the order of about 20% or less. The machine direction shrinkage is primarily provided and controlled by the drawing rate at the nip of the two juxtaposed rolls and cooling air applied to the bubble exterior. The appropriate machine direction heat shrinkage can be simply provided by providing a machine direction linear velocity at the nip of the rolls in a ratio of at least about 2:1, and preferably at least about 3:1, relative to the linear velocity of the extrudate just as it issues from the die. As is well known the cross direction shrinkage in a "blown bubble" technique is primarily provided by the internal air employed to blow the bubble and external cooling air. To provide the desired cross direction heat shrinkage characteristic it will be preferred to use a blow up ratio (diameter of the bubble divided by the diameter of the die of about 2:1 or less). The respective flow rates will be routinely adjusted to produce a non-cellular layer 24 having a thickness preferably on the order of about ½ to about 4 mils and a cellular layer having a thickness on the order of about 10 to about 30 mils with the process similarly being adjusted so that the density of the cellular layer 22 is in the range of about 10 to about 35 pounds per cubic foot, and preferably less than 30. The sleeve or tubular member is formed from the sheet or film of composite material in a conventional manner but it is preferred to bring the longitudinal extremities of the sheet into engagement, such as, for example, by winding around a mandrel, and then to seal these extremities to each other in the axial direction. Preferably these longitudinal extremities are brought into an overlapped relationship and then heat sealed by contact with an electrically, or other appropriately heated, bar or wire. Of course as indicated in the drawings the sleeve will be formed such that the cellular layer will be disposed inwardly of the sleeve and the non-cellular layer will be disposed outwardly. The sleeve member will be characterized by having a smooth, non-fibrillated generally glossy external surface on non-cellular layer 24 and the cellular layer will be characterized by being of a closed cellular structure generally having uniform and small voids therein. The sleeve member is then telescopically located about the sidewall 20 of a container 10 with closed cellular layer being adjacent the wall surface of the container and the non-cellular layer being disposed outwardly thereof. Subsequently conventional heating techniques are employed, for example sufficient heating in an oven for a time and at a temperature, to allow the heat shrinkable sleeve member to shrink and contract into snug engagement with the container wall surface. If the container is of the type generally set forth in the drawing, i.e., it is possessed of a recessed bottom, upon bringing the sleeve into telescopic location with the sidewall, the lower portion of the sleeve will be disposed beneath the lowest extremity of the container; upon heat shrinking the sleeve will be brought not only into snug engagement with the wall surface but the lower portion of the sleeve will shrink so as to extend inwardly into the recessed bottom of the container. The size of the sleeve which is employed of course will vary with the specific application but in general it may be stated that the sleeve will be so formed that its diameter in its heat shrinkable state will be on the order of about 0.015–0.050 inch larger than the diameter of the container involved.

While the foregoing describes the present invention with sufficient particularity to enable those skilled in the art to make and use same and includes the best modes contemplated in practicing this invention there, nonetheless, follows a general example which should even yet more clearly enable those skilled in the art to make and use the present invention.

A sheet of the composite structure contemplated for use herein was first manufactured using a "blown bubble" co-extrusion technique. The cellular and non-cellular layers of the composite structure were low density polyethylene. The extruder feeding the polymeric material intended to form the cellular layer was fed into the extrusion die so as to form the inner layer of the resulting tubular member; this extruder was charged with low density polyethylene such as that manufactured by U.S. Industrial Company (U.S.I.) under their designation NA-289 and the charge likewise included about 0.75% by weight of azodicarbonamide as the foaming agent. The extruder intended to supply the material to form the non-cellular layer was fed to the co-extrusion die so as to form the external surface of the resulting extruded tubular member; the extruder was charged with the same polyethylene and the charge to this extruder also included as an adjuvant about 2% of white pigment. While various temperatures may be employed in the respective extruders good results will be obtained by employing temperatures in the range of 280° to about 310° F. on the extruder supplying the cellular forming composition and about 245° to about 300° F. on the extruder supplying the non-cellular forming composition. The extrudate issued from the co-extrusion die as a tubular member which was then blown into a bubble using a blow up ratio (diameter of the bubble to the diameter of the circular die) of about 1.5:1. Cooling air was also blown onto the external surface of the bubble. This bubble was then compressed into a flattened tube by passage through the nip of two juxtaposed rolls with the rolls being run at a sufficient speed relative to the speed of the material issuing from the extruder so as to provide a heat shrinkage in the machine direction of extrusion between about 50 to about 70%; the foregoing blow up ratio resulted in a cross, or transverse, direction heat shrinkage on the order of about 10 to 20%. The flattened tube was then cut along its edges, and in the machine direction, to produce two superposed composite structures, which structures were then independently wound onto independent winding wheels. This rolled stock was then, in turn decorated by conventional techniques, with the decoration being applied to the non-cellular layer, and the decorated material, in turn, again slit in the machine direction to provide strips of a heat shrinkable composite structure in which the cellular layer was of a closed cell structure and adheringly engaged to this cellular layer, was the non-cellular layer with a smooth, glossy, non-fibrillated surface. The total thickness of this composite structure was about 14.5 mils, the density was about 35 or 36 pounds per cubic foot and the cell count of the closed cellular layer was on the order of about one hundred thousand to about five million cells per cubic centimeter. The foregoing produced strips were then again slit, this time along the cross direction of formation, and wound around a cylindrically shaped mandrel with the longitudinal extremities of the material being brought into overlapping contact with each other and then heat sealed in overlapped relationship by contact with an electrically heated bar. The formation of this sleeve was done in such fashion that the cellular layer is disposed inwardly of the sleeve, the non-cellular layer is disposed outwardly and the major direction of shrinkage (formerly the machine direction) was in a circumferential, or radial, direction of the sleeve and the minor direction of shrinkage (formerly the cross, or transverse, direction of the sheet) was the axial direction of the sleeve. The formation of the sleeve and the formation of the package can generally be done following the disclosures of U.S. Pat. Nos. 3,767,496 and 3,802,942. The sleeve member was then, from beneath a glass container of the type illustrated in the drawings, telescopically located about the sidewall of the container with a portion, i.e. about the lower ½ inch of the sleeve being disposed beneath the lowest extremity of the container. The container had been preheated to a temperature of about 240° F. and, with the telescopic location of the sleeve about the container, an initial heat shrinking took place with the sleeve taking on an egg shaped configuration which held it in place on the container. The inside diameter of the sleeve was sized to be on the order of about 0.031 inch larger than the diameter of the container. The container with the now egg shaped sleeve on it was then put in a heating tunnel maintained at about 550° F. for a period of about 15 seconds whereby final shrinking resulted in which the sleeve was brought into snug engagement with the wall surface of the container and the lower portion of the sleeve shrunk so as to extend inwardly into the recessed bottom of the container. The resulting article with the composite structure thereon was possessed of a highly aesthetically pleasing, glossy, smooth external surface and the adhesion of the two layers was excellent. It was observed that difficulties with splitting and tearing were significantly alleviated and the sleeve member exhibited excellent resistance to denting and scarring, showed excellent glass retention characteristics upon bottle breakage, was highly opaque, was quite flexible and demonstrated the possession of all needed properties.

While the foregoing sets forth the present invention it will be apparent that modification is possible which does not depart from the spirit and scope of this invention. In the claims which follow reference to the composition of the respective cellular and non-cellular layers is made to the polymeric material only. It, of course, being understood that the respective layers can include suitable adjuvants.

I claim:

1. In an article of manufacture comprising a container having a sidewall and further including a heat shrunk, polymeric seamed sleeve disposed circumferentially outwardly of said sidewall and in snug engagement therewith, the improvement wherein said polymeric sleeve is a composite structure of a closed cellular polyethylene layer and a non-cellular polyethylene layer in adhering contact with said cellular layer, *said composite structure having been formed by blown bubble co-extrusion with a blow-up ratio of about 2:1 or less and having a machine direction heat-shrinkage of at least 50% and a cross-diameter heat-shrinkage of 20% or less,* said cellular layer being in engagement with said sidewall and said non-cellular layer being disposed outwardly of said cellular layer.

2. The improvement of claim 1 wherein said sleeve consists essentially of said two layers, has a density of about 10 to about 40 pounds per cubic foot and a thickness of about 10½ to 34 mils and wherein said polyethylene of said cellular and said non-cellular layer being independently selected from the group consisting of high density, low density, medium density polyethylene and blends thereof.

3. In an article of manufacture comprising a container having a sidewall and further including a heat shrunk, polymeric sleeve disposed circumferentially outwardly of said wall and in snug engagement therewith, the improvement wherein said polymeric sleeve is a composite structure consisting essentially of two layers, one of said layers being a closed cellular polymeric layer, said polymeric layer being at least 60% by weight of polymerized moieties of an olefin, selected from the group consisting of ethylene, propylene, butene-1 or mixtures thereof and the other of said layers being a non-cellular polymeric layer, said latter polymeric layer being at least 60% by weight of polymerized moieties of an olefin selected from the group consisting of ethylene, propylene, butene-1 or mixtures thereof, *said composite structure having been formed by blown bubble co-extrusion with a blow-up ratio of about 2:1 or less and having a machine direction heat-shrinkage of at least 50% and a cross-direction heat-shrinkage of 20% or less, the heat-shrinkage of said sleeve in the circumferential direction corresponding to the machine direction heat shrinkage and the heat shrinkage of said sleeve in the axial direction corresponding to the cross-direction heat shrinkage,* and wherein said cellular layer is in engagement with said sidewall and said non-cellular layer being disposed outwardly of said cellular layer and in adhering contact therewith.

4. The improvement of claim 3 wherein one of said layers consists essentially of polymerized ethylene moieties and polymerized moieties of a vinyl ester of a saturated carboxylic acid and wherein said vinyl ester moiety is less than about 15 weight percent and the ethylene moiety is in excess of about 85 weight percent.

5. The improvement of claim 4 wherein said vinyl ester is vinyl acetate.

6. The improvement of claim 5 wherein the moiety of said vinyl acetate is less than about 10% by weight.

7. The improvement of claim 6 wherein the other of said layers consists essentially of polyethylene.

8. The improvement of claim 3 wherein one of said layers consists essentially of polymerized ethylene moieties and polymerized moieties of an alpha-beta monoethylenically unsaturated carboxylic acid, wherein the ethylene moiety is at least about 65 weight percent and wherein the alpha-beta monoethylenically unsaturated carboxylic acid moiety is less than about 35 weight percent and wherein said other layer consists essentially of polyethylene.

9. The improvement of claim 3 wherein one of said layers consists essentially of polymerized ethylene moieties and polymerized moieties of an alkyl ester of an alpha-beta monoethylenically unsaturated carboxylic acid, wherein the ethylene moiety is at least about 75 weight percent and wherein the moiety of the alkyl ester of an alpha-beta monoethylenically unsaturated carboxylic acid is less than about 25 weight percent and wherein said other layer consists essentially of polyethylene.

10. The improvement of claim 3 wherein at least one of said layers consists essentially of polypropylene.

11. In a method wherein a heat shrinkable, polymeric sheet is formed into a sleeve having a heat sealed overlapped seam and having a major heat shrinkage circumferentially of said sleeve and said sleeve is telescopically located about the sidewall of a container, and heat shrunk into snug engagement with said sidewall, the improvement wherein said polymeric sheet is a coextruded composite structure consisting essentially of two layers, one of said layers being a closed cellular polyethylene layer and the other being a non-cellular polyethylene layer in adhering contact with said cellular polyethylene layer, *said composite structure having been formed by blown bubble co-extrusion with a blow-up ratio of about 2:1 or less and having a machine direction heat shrinkage of at least 50% and a cross-direction heat shrinkage of 20% or less,* said cellular layer being brought into engagement with said wall and said non-cellular layer being disposed outwardly of said cellular layer and wherein the circumferential direction of said sleeve corresponds to the machine direction of coextrusion.

12. In a method wherein a heat shrinkable polymeric sheet is formed into a sleeve having a major heat shrinkage circumferentially of said sleeve and said sleeve is telescopically located about the sidewall of a container and heat shrunk into snug engagement with said sidewall, the improvement wherein said polymeric sheet is a composite structure consisting essentially of two layers, one of said layers being a closed cellular polymeric layer, said polymeric layer being at least 60% by weight of polymerized moieties of an olefin, selected from the group consisting of ethylene, propylene, butene-1 or mixtures thereof and the other of said layers being a non-cellular polymeric layer, said latter polymeric layer being in adhering contact with said cellular layer, said non-cellular polymeric layer being at least 60% by weight of polymerized moieties of an olefin selected from the group consisting of ethylene, propylene, butene-1 or mixtures thereof, *said composite structure having been formed by blown bubble co-extrusion with a blow-up ratio of about 2:1 or less and having a machine direction heat shrinkage of at least 50% and a cross-direction heat shrinkage of 20% or less, the heat shrinkage of said sleeve in the circumferential direction corresponding to the machine direction heat shrinkage and the heat shrinkage of*

*said sleeve in the axial direction corresponding to the cross-direction heat shrinkage,* and wherein said cellular layer is brought into snug heat shrunk engagement with said sidewall and said non-cellular layer being disposed outwardly of said cellular layer.

13. The improvement of claim 12 wherein one of said layers consists essentially of polymerized ethylene moieties and polymerized moieties of a vinyl ester of a saturated carboxylic acid and wherein said vinyl ester moiety is less than about 15 weight percent and the ethylene moiety is in excess of about 85 weight percent.

14. The improvement of claim 13 wherein said vinyl ester is vinyl acetate.

15. The improvement of claim 14 wherein the moiety of said vinyl acetate is less than about 10%.

16. The improvement of claim 15 wherein the other of said layers consists essentially of polyethylene.

17. The improvement of claim 12 wherein one of said layers consists essentially of polymerized ethylene moieties and polymerized moieties of an alpha-beta monoethylenically unsaturated carboxylic acid wherein the ethylene moiety is at least about 65 weight percent and wherein the alpha-beta monoethylenically unsaturated carboxylic acid moiety is less than about 35 weight percent and wherein said other layer consists essentially of polyethylene.

18. The improvement of claim 13 wherein one of said layers consists essentially of polymerized ethylene moieties and polymerized moieties of an alkyl ester of an alpha-beta monoethylenically unsaturated carboxylic acid, wherein the ethylene moiety is at least about 75 weight percent and wherein the moiety of the alkyl ester of an alpha-beta monoethylenically unsaturated carboxylic acid is less than about 25 weight percent and wherein said other layer consists essentially of polyethylene.

19. The improvement of claim 12 wherein at least one of said layers consists essentially of polypropylene.

20. The improvement of claim 11 wherein said sheet has a density of about 10 to about 40 pounds per cubic foot and a thickness of about 10½ to about 34 mils and wherein said polyethylene of said cellular and said non-cellular layer is independently selected from the group consisting of high density, low density, medium density polyethylene and blends thereof.

21. The article of claim 1 wherein said container is a glass container.

22. The method of claim 12 wherein said container is a glass container.

* * * * *